United States Patent Office 2,775,600
Patented Dec. 25, 1956

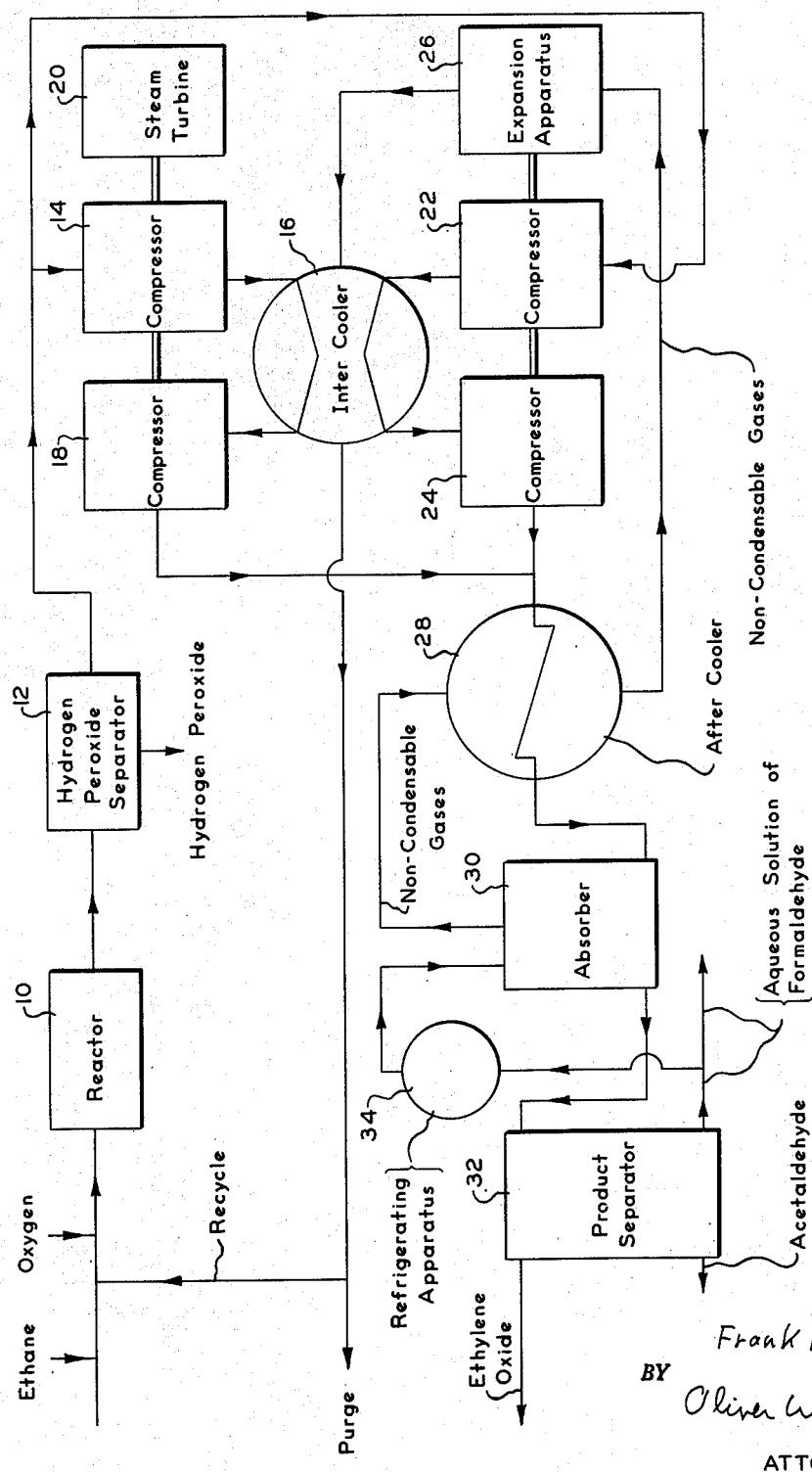

2,775,600

SEPARATION OF ETHYLENE OXIDE FROM A GASEOUS MIXTURE CONTAINING SAME

Frank Maslan, Brookline, Mass., assignor to National Research Corporation, Cambridge, Mass., a corporation of Massachusetts Application June 1, 1954, Serial No. 433,644

5 Claims. (Cl. 260—348)

The present invention relates to the production of chemicals and more particularly to the recovery of ethylene oxide and other valuable oxygenated chemicals from a gas stream resulting from the oxidation of a mixture comprising ethane and recycle gases rich in ethylene in a low-temperature, low pressure, non-catalytic reaction zone.

Of late years, the workers in the art have been stirred to devise cheaper and more efficient methods of producing ethylene oxide which has come to be of great commercial consequence as an intermediate in the production of plastics, anti-freeze and other much-used products.

Accordingly, a principal object of this invention is to provide an economical and novel process for separating ethylene oxide from gaseous mixtures comprising ethylene oxide as well as acetaldehyde and formaldehyde.

Another object of the present invention is to separate acetaldehyde from gaseous mixtures comprising acetaldehyde and other hydrocarbons which result from the oxidation of ethane.

Still another object is to separate formaldehyde from gaseous mixtures comprising formaldehyde, ethylene oxide and other hydrocarbons which result from the oxidation of ethane.

Another object of the present invention is to provide pressurized conditions at which ethylene oxide and aldehydes may be rapidly and completely recovered.

Still another object of this invention is to provide a process for the recovery of ethylene oxide and acetaldehyde whereby there is recoupment of substantial amounts of energy expended in their separation.

These and other objects of the invention will in part be obvious and will in part appear hereinafter.

The invention comprises the process involving the several steps and the relation and the order of one or more of such steps with respect to each of the others which are exemplified in the following detailed disclosure, and the scope of the application of which will be indicated in the claims.

For a fuller understanding of the nature of the invention, reference should be had to the following detailed description taken in connection with the accompanying drawing which is a flow sheet illustrating one preferred embodiment of the invention.

In the present invention, ethylene oxide is recovered from gaseous mixtures comprising ethylene oxide, acetaldehyde and formaldehyde. This mixture is preferably produced by the partial oxidation of ethane, as more fully described and claimed by Gardner et al. in the copending application Serial No. 370,065, filed July 24, 1953. In addition to the excellent yields of ethylene oxide and organic aldehydes, the effluent gas stream leaving the reactor also contains a considerable quantity of hydrogen peroxide. The ease with which hydrogen peroxide both dissociates and reacts while contained in such an effluent gas stream, as is present here, dictates that it be rapidly separated therefrom. It is preferred that this separation be effected by the methods more fully described and claimed in the copending applications Serial No. 432,596, filed May 26, 1954, and Serial No. 433,805, filed June 1, 1954.

In order to facilitate an economical recovery of formaldehyde, acetaldehyde and ethylene oxide, the effluent gases from which the hydrogen peroxide has been removed are compressed to a pressure exceeding atmospheric pressure. While in this compressed state, the effluent gases are subjected to a stripping operation, thereby transposing the above-mentioned aldehydes and ethylene oxide from a gaseous to a liquid state, from which these components are then individually separated. The remaining effluent gases, which will hereinafter be referred to as the noncondensable gases, are then expanded to recover the energy expended in their compression. A portion of the expanded noncondensable gases is then recycled to the reactor.

In a preferred embodiment of the invention, a mixture comprising ethane and recycled noncondensable gases is reacted with oxygen in a reaction zone, the pressure of which is on the order of atmospheric pressure. While the preferred conditions of the reaction are conducive to rich yields in recoverables comprising ethylene oxide, formaldehyde and acetaldehyde, they are not so favorable with respect to the separation of these products from the noncondensable gases. For this reason, it has been found that, after the hydrogen peroxide has been removed, the effluent gases should be compressed to a pressure exceeding atmospheric, more particularly to a pressure on the order of about 100 p. s. i. Any type of compressor capable of handling large volumes of gases may be used for this compression step.

After being compressed, the effluent gases are scrubbed by a liquid-absorbing medium which will absorb ethylene oxide, formaldehyde and acetaldehyde. The liquid phase so formed is then physically separated from the gaseous phase comprising the remainder of the effluent gases. The acetaldehyde, formaldehyde and ethylene oxide are then separated from the liquid-absorbing medium and later from one another. The best results are achieved when the absorbing or stripping operation is carried out at temperatures approaching the freezing point of the liquid-absorbing medium. Temperatures on the order of between about 0° C. and 20° C. have been found to be satisfactory, with preferred temperatures being on the order of about 2° C.

Liquid-absorbing media comprised of aqueous solutions of formaldehyde have been found preferable. The choice of aqueous solutions of formaldehyde as an absorbing medium in the stripping operation has the advantage that it facilitates an economical processing of formaldehyde to commercial concentrations. However, any liquid-absorbing medium such as water or oxygenated paraffinic hydrocarbons containing on the order of eight or less carbon atoms may be used. It is desirable that the formaldehyde concentration of the preferred absorbing media be retained as close to commercial concentration as is possible. Material balance in our preferred embodiment, however, dictates that the formaldehyde concentration of the aqueous formaldehyde-absorbing medium be on the order of about 10 percent by weight formaldehyde. It is also preferred that the absorbing medium be continuously recycled and the excess, above that required for stripping, be continually drawn off and processed into commercial formaldehyde.

The noncondensable gases, after having been stripped of ethylene oxide and aldehydes, remain in a cool, compressed state and as such may be used to cool and compress the effluent gases which are continuously entering the stripping stage. Preferably, the noncondensable gases are first routed through an after-cooler of a multistage compressor and then into a centrifugal, radial or other type of expansion apparatus which in turn drives a centrifugal compressor used to compress a portion of the effluent gases. The noncondensable gases leaving the expansion apparatus are then used as a refrigerant in an inter-cooler or coolers of a multi-stage compressor. A portion of the noncondensable gases which is sufficient to insure continuous operation is recycled to the reactor while the remaining portion is purged.

Referring now to the drawing, there is shown a flow sheet which illustrates one preferred embodiment of the invention. In this preferred form of the process, the effluent gases which generally contain ethylene oxide, hydrogen peroxide, formaldehyde, acetaldehyde, methane, ethane, ethylene, carbon oxides and oxygen are led from the reactor 10 into the hydrogen peroxide separator 12 wherein the hydrogen peroxide is removed. On leaving the hydrogen peroxide separator 12, the remaining effluent gases are divided into two streams, one of which contains approximately twice as much gas as the other. The lesser stream proceeds through a first compression stage 14, goes next through the inter-cooler 16 and is then further compressed in a second stage 18, and finally is again refrigerated in after-cooler 28. The larger stream, meanwhile, undergoes compression in first stage 22, then is cooled in inter-cooler 16. After being further compressed in the second phase 24, the larger stream is re-united in the after-cooler 28 with the other or lesser stream.

The effluent gases, now compressed on the order of about 100 p. s. i., are introduced into the absorber 30 where they are scrubbed with an absorbing medium such as an aqueous solution of formaldehyde. The liquid phase resulting from the scrubbing of the effluent gas mixture in absorber 30 is directed to a product separator 32 wherein the ethylene oxide, acetaldehyde and an aqueous solution of formaldehyde are separated from one another. That portion of the aqueous solution of formaldehyde which is in excess of the amount needed to be recycled to absorber 30 as a scrubbing mixture is removed and processed to a formaldehyde solution of commercial concentration. The portion of the aqueous solution of formaldehyde which is to be recycled is first passed through a suitable refrigerating apparatus 34 and cooled to a temperature approaching its freezing point. The cooled absorbing medium is then introduced into the absorber 30.

Returning now to that portion of the effluent gases referred to as noncondensable gases (i. e., methane, ethane, ethylene, carbon oxides and oxygen) which remains after the liquid phase comprising ethylene oxide and aldehydes has been stripped therefrom in the absorber 30, these cool noncondensable gases are cycled to the after-cooler 28 where they act as a refrigerant for the compressed gases being fed to the absorber. The noncondensable gases leave the after-cooler and are then allowed to expand in the expansion apparatus 26, which in turn preferably drives the compressor stages 22 and 24. On being expanded, the noncondensable gases serve as a refrigerant in inter-cooler 16. A portion of the noncondensable gases is recycled to the reactor 10 and a portion is purged.

Although specific operating conditions and apparatus are described in the above preferred embodiments, the invention is not limited to those specific elements and steps described. For example, a reciprocating type of expansion apparatus could be used in place of a centrifugal expansion apparatus to recover energy from the compressed gases. By the same token, numerous other modifications in the invention may be made by those skilled in the art.

Since certain changes may be made in the above process and apparatus without departing from the scope of the invention herein described, it is intended that all matter contained in the above description or shown in the accompanying drawing shall be interpreted as illustrative and not in a limiting sense.

What is claimed is:

1. In the process for separating ethylene oxide, formaldehyde and acetaldehyde from an effluent gaseous mixture freed of hydrogen peroxide and obtained from an oxidation of ethane and recycle gases rich in ethylene in a low-temperature, low-pressure, noncatalytic reaction, the improvement which comprises compressing said effluent gaseous mixture to a pressure on the order of about 100 p. s. i., absorbing a mixture comprising acetaldehyde, formaldehyde and ethylene oxide therefrom with a liquid-absorbing medium selected from the group consisting of water and aqueous solutions of formaldehyde maintained at a temperature below about 20° C., and decompressing the remainder of the effluent gaseous mixture to recover the energy content therefrom.

2. In the process for separating ethylene oxide, formaldehyde and acetaldehyde from an effluent gaseous mixture obtained from an oxidation of ethane and recycle gases rich in ethylene in a low-temperature, low-pressure, noncatalytic reaction, the improvement which comprises compressing said effluent gaseous mixture to a pressure on the order of about 100 p. s. i., absorbing ethylene oxide, formaldehyde and acetaldehyde from said gaseous mixture with an aqueous solution of formaldehyde maintained near its freezing point, separating ethylene oxide and acetaldehyde from the resulting aqueous solution of formaldehyde and recycling a portion of said aqueous formaldehyde solution as the absorbing medium, expanding the remainder of the effluent gaseous mixture to utilize the energy contained therein, and recycling a portion of said expanded gases to the oxidation reaction.

3. The process of claim 5 wherein the aqueous solution of formaldehyde comprises about 10% by weight formaldehyde.

4. In the process for separating ethylene oxide, formaldehyde and acetaldehyde from an effluent gaseous mixture freed of hydrogen peroxide and obtained from an oxidation of ethane and recycle gas such as ethylene in a low-temperature, low-pressure, noncatalytic reaction, the improvement which comprises compressing said effluent gaseous mixture to a pressure on the order of about 100 p. s. i., absorbing a mixture comprising acetaldehyde, formaldehyde and ethylene oxide therefrom with a liquid-absorbing medium comprising water maintained at a temperature below about 20° C., and decompressing the remainder of the effluent gaseous mixture to recover the energy content therefrom.

5. In the process for separating ethylene oxide, formaldheyde and acetaldehyde from an effluent gaseous mixture freed of hydrogen peroxide and obtained from an oxidation of ethane and recycle gas such as ethylene in a low-temperature, low-pressure, noncatalytic reaction, the improvement which comprises compressing said effluent gaseous mixture to a pressure on the order of about 100 p. s. i., absorbing a mixture comprising acetaldehyde, formaldehyde and ethylene oxide therefrom with a liquid-absorbing medium comprising an aqueous solution of formaldehyde maintained at a temperature below about 20° C., and decompressing the remainder of the effluent gaseous mixture to recover the energy content therefrom.

References Cited in the file of this patent

UNITED STATES PATENTS

| Number | Name | Date |
|---|---|---|
| 2,169,210 | Balcar | Aug. 15, 1939 |
| 2,241,716 | Roberts | May 13, 1941 |
| 2,241,717 | Robinson et al. | May 13, 1941 |
| 2,325,576 | Balcar | July 27, 1943 |
| 2,325,577 | Balcar | July 27, 1943 |
| 2,622,088 | Thomas | Dec. 16, 1952 |